July 17, 1951     G. KLEIN     2,560,959
COOKING STOVE
Filed Dec. 30, 1946
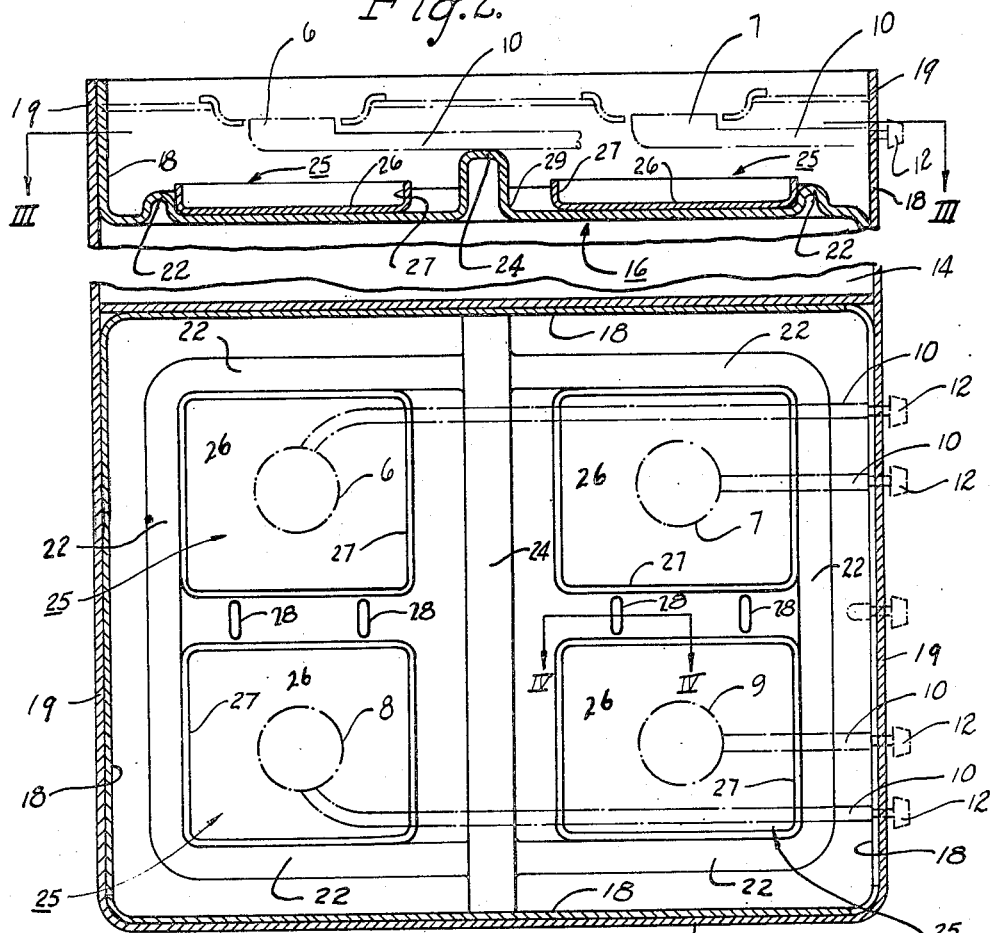
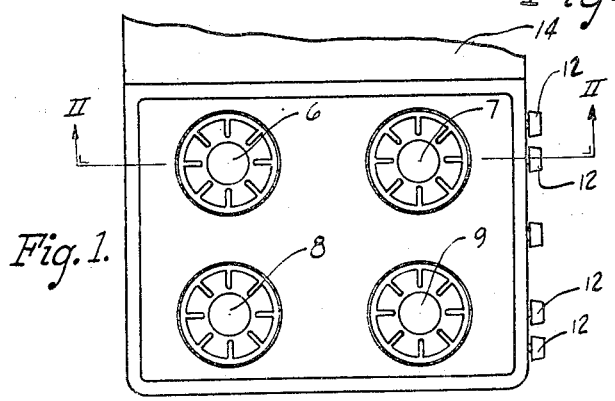
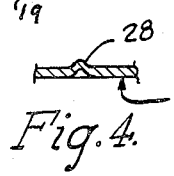
INVENTOR
Gustav Klein.
BY Louis Necho
ATTORNEY Patented July 17, 1951

2,560,959

UNITED STATES PATENT OFFICE 2,560,959

COOKING STOVE

Gustav Klein, Melrose Park, Pa., assignor to Caloric Stove Corporation, Philadelphia, Pa., a corporation of Pennsylvania Application December 30, 1946, Serial No. 719,145

1 Claim. (Cl. 126—39)

My invention relates to a cooking stove and it relates more particularly to improvements in the structure of the upper portion of the body of the stove.

In cooking stoves, be they gas or electric, it is necessary to provide a drip pan beneath the burners or heating elements for catching drippings or spillage. As far as I know, drip pans heretofore used have either been in the nature of a fixed wall which constituted a closure for the stove body below the burners, or such drip pans were in the nature of a large panel removably mounted beneath the burners and capable of being pulled out after the fashion of a drawer. When the drip pan is in the nature of a fixed wall, it is very difficult to clean because of the necessity of removing the burners or heating elements, their connections and other objects and because the cleansing means, such as solutions, scrapers, detergents, etc., must be brought to and used in the vicinity of the top of the stove. Sugar-containing, or other, drippage which, when heated, leaves a hard, fast-adhering residue are particularly difficult to remove from a fixed drip pan. When the drip pan is removable but is made of one piece which is coextensive with the top of the stove or range, difficulty is again encountered because a pan of this size is too big to be washed in the usual kitchen sink without splashing, discomfort and inconvenience. Also, it becomes necessary to remove and wash the large drip pan whenever dripping or spilling occurs in the vicinity of any one of a plurality of burners.

It is, therefore, one object of my invention to produce an improved arrangement whereby small, separately-removable drip pans are provided under the various burners to facilitate cleaning of the drip pans.

A further object is to produce an improved structure of the top of the stove below the burners so as to provide a support for the drip pans and for certain parts of the burners.

These and other objects are attained by my invention as set forth in the following specification and as illustrated in the accompanying drawings in which:

Fig. 1 is a reduced, fragmentary top plan view of a cooking stove embodying my invention.

Fig. 2 is an enlarged, fragmentary vertical sectional view taken on line 2—2 of Fig. 1.

Fig. 3 is a horizontal sectional view taken on line 3—3 of Fig. 2.

Fig. 4 is a fragmentary sectional view taken on line 4—4 of Fig. 3.

In the drawings, there is shown a conventional cooking stove which is provided with a plurality of heating elements 6, 7, 8 and 9, which are in the nature of gas burners supplied with a combustible mixture through pipes 10 controlled by cocks and valves 12 arranged along the front wall of the stove in the usual manner. While I have shown four gas burners, it is to be understood that the invention is applicable irrespective of the number of heating elements and regardless of whether the heating elements are gas burners or electrically-energized elements. Adjacent the heating elements and extending to one or to both sides thereof is an oven or storage compartment 14.

In carrying out my invention, I form the under top of the stove, that is, the wall thereof which underlies the burners, of a single piece 16 of sheet metal, which may be stamped and shaped in one operation. This wall 16, which is hereinafter referred to as the top of the stove, is generally flat and is provided with vertical flanges 18 which abut against the corresponding upper portions 19 of the vertical walls of the stove and to which they are bolted or otherwise secured. The top 16 and the flanges 18 thus form a well for receiving the gas burners or other heating elements 20.

The top 16 is provided along its entire perimeter with a continuous raised bead 22 which is preferably struck upwardly from the body of the top. The bead 22 extends generally to and is slightly spaced inwardly from the vertical flanges 18. The top 16 is also provided with a central ridge 24 which is higher than the bead 22 and which is also struck upwardly from the under top 16 and forms a support for certain of the gas pipes 10 and for the burners themselves or the adjuncts thereof, as shown in Fig. 1.

The ridge 24 cooperates with the portions of the bead 22 on either side thereof to form two substantially rectangular shallow wells, each of which underlies a pair of heating elements. In the present instance, the ridge 24 extends parallel to the front and rear walls of the stove, and the rectangular wells thus formed extend longitudinally of the front and rear walls of the stove. Under each of the heating elements is a separable shallow trough or dish-like receptacle 25 formed of a bottom wall 26 and vertical side walls or flanges 27. The receptacles 25 are made large so as to catch drippings or spillage from the material being cooked over the burners. In the spaces intervening between the juxtaposed, inner edges of each pair of adjacent receptacles 25, I provide raised portions or humps 28, which are struck upwardly from the under top 16 and which coact with the ridge 24 and the beads 22 in locating the various receptacles 25.

In use, when dripping or spillage occurs from a cooking utensil above a particular burner, it is merely necessary to remove such burner and as much of the corresponding grate as may be necessary to remove the particular receptacle 25 under said burner. The receptacle is then taken to the kitchen sink where it can be washed in the usual dishpan without inconvenience or splashing, and without having to disturb the other receptacles which are still clean. In the event that the material spilled is excessive and overflows the receptacle 25, it will be confined by the bead 22 and ridge 24 and will be prevented from spreading over the entire surface of the top 16 or from reaching the vertical flanges 18 thereof. In this event, after the particular receptacle has been removed, the affected area of the under top 16 can be locally cleaned. In order to facilitate cleaning, the junction of the ridge 24 and the bead 22 with the flat top 16 is curved, as clearly shown at 29. The provision of the bead 22 and the ridge 24 also serves to strengthen the top, thus making it rigid and protecting it against warping. As will be seen from Figs. 2 and 3, the ridge 18 supports the arms which carry burners 6 and 8. This eliminates the usual supporting brackets and makes cleaning of the parts below the burners much easier.

Having described my invention, what I claim is:

An integral top burner box for a gas stove having front and rear burners, said box having vertical side walls, a vertical back wall and a horizontal bottom wall, said bottom comprising a flat body portion and a bead struck up from said portion immediately inwardly from the edges thereof, and a ridge also struck up from said flat body portion and extending from one of said side walls to the other of said side walls, said ridge being higher than said bead and serving to support the rear burners of the stove and cooperating with said bead to form a plurality of rimmed-in areas below said front and rear burners.

GUSTAV KLEIN.

REFERENCES CITED

The following references are of record in the file of this patent:

UNITED STATES PATENTS

| Number | Name | Date |
|---|---|---|
| 1,159,896 | Caverly | Nov. 9, 1915 |
| 1,498,049 | Longfellow | June 17, 1924 |
| 1,736,473 | Wilde | Nov. 19, 1929 |
| 2,028,636 | Wilkinson et al. | Jan. 21, 1936 |
| 2,160,765 | Taylor | May 30, 1939 |
| 2,180,645 | Sherman | Nov. 21, 1939 |
| 2,320,754 | Sherman | June 1, 1943 |
| 2,384,262 | Rutan | Sept. 4, 1945 |
| 2,414,162 | Morton | Jan. 14, 1947 |

FOREIGN PATENTS

| Number | Country | Date |
|---|---|---|
| 500,802 | Great Britain | Feb. 14, 1939 |
| 518,698 | Great Britain | Mar. 5, 1940 |